(12) United States Patent
Albalos

(10) Patent No.: US 12,662,307 B2
(45) Date of Patent: Jun. 23, 2026

(54) RECREATIONAL VEHICLE WASTE RECEPTACLE

(71) Applicant: Victoria Albalos, Norco, CA (US)

(72) Inventor: Victoria Albalos, Norco, CA (US)

( * ) Notice: Subject to any disclaimer, the term of this patent is extended or adjusted under 35 U.S.C. 154(b) by 29 days.

(21) Appl. No.: 18/998,879

(22) PCT Filed: Aug. 29, 2024

(86) PCT No.: PCT/US2024/044398
§ 371 (c)(1),
(2) Date: Jan. 27, 2025

(87) PCT Pub. No.: WO2025/136470
PCT Pub. Date: Jun. 26, 2025

(65) Prior Publication Data
US 2026/0008611 A1      Jan. 8, 2026

Related U.S. Application Data

(60) Provisional application No. 63/611,176, filed on Dec. 17, 2023.

(51) Int. Cl.
B65F 1/00      (2006.01)
B60R 15/04      (2006.01)

(52) U.S. Cl.
CPC .............. B65F 1/002 (2013.01); B60R 15/04 (2013.01)

(58) Field of Classification Search
CPC ..... A47K 11/06; A47K 11/105; A61F 13/551; A61F 2013/55195; A61F 2013/8402; B60R 15/04; B60R 1/002
(Continued)

(56) References Cited

U.S. PATENT DOCUMENTS

| | | | |
|---|---|---|---|
| 2,801,426 A | 8/1957 | La Gorce et al. | |
| 4,756,273 A * | 7/1988 | Yananton ............. | A01K 1/0107 |
| | | | 119/169 |

(Continued)

FOREIGN PATENT DOCUMENTS

| | | |
|---|---|---|
| ES | 1287244 U | 2/2022 |
| JP | 2005130961 A | 5/2005 |

(Continued)

OTHER PUBLICATIONS

Bogina Bag, BoginaBag Foldable Portable Folding Toilet for Festivals, Camping, Fishing, Hiking (Bog in a Bag), https://www.gadgets4travel.com/boginabag-foldable-portable-folding-toilet--for-festivals-camping-fishing-hiking-bog-in-a-bag-1086-p.asp.

(Continued)

*Primary Examiner* — Nathan J Newhouse
*Assistant Examiner* — Matthew T Theis
(74) *Attorney, Agent, or Firm* — David A. Belasco; Belasco Jacobs & Townsley, PC

(57) ABSTRACT

An RV waste receptacle includes a top layer formed of flexible, absorbent material, a middle impermeable layer having the planar dimensions of the top layer affixed to the top layer at its front, side and rear edges. A bag formed of impermeable material has an open mouth, sealed side seams and a sealed bottom seam. The bottom seam is joined to a rear edge of the middle layer. A bottom layer is joined to the middle layer forming an open pocket for the bag. The bag includes a pull tab attached to the open mouth. The invention is placed in an RV toilet and used. After use, the pull tab is used to extend the bag. A hand is inserted into the bag grasping the underside of the bottom layer and pulling it and the contents of the layers into the bag to be sealed and disposed of.

7 Claims, 4 Drawing Sheets

(58) Field of Classification Search
USPC ............................................................ 383/42
See application file for complete search history.

(56)                    References Cited

U.S. PATENT DOCUMENTS

| | | | |
|---|---|---|---|
| 4,959,881 A * | 10/1990 | Murray | A47L 13/18 |
| | | | 294/1.3 |
| 5,301,806 A | 4/1994 | Olson | |
| 5,304,158 A * | 4/1994 | Webb | A61F 13/8405 |
| | | | 604/385.13 |
| 6,116,780 A | 9/2000 | Young et al. | |
| 7,260,855 B2 | 8/2007 | Aycock | |
| 7,313,833 B2 | 1/2008 | Wee | |
| 8,209,793 B2 | 7/2012 | Carter et al. | |
| 11,771,049 B2 * | 10/2023 | Axelrod | B32B 3/08 |
| | | | 119/161 |
| 2002/0193762 A1 | 12/2002 | Suydam | |
| 2005/0256487 A1 * | 11/2005 | Williams | A61F 13/551 |
| | | | 604/385.19 |
| 2007/0083988 A1 | 4/2007 | Clark | |
| 2011/0247132 A1 | 10/2011 | Watts | |
| 2017/0073913 A1 | 3/2017 | Patel | |
| 2022/0039619 A1 * | 2/2022 | Barr | A47K 13/06 |

FOREIGN PATENT DOCUMENTS

| | | |
|---|---|---|
| JP | 2007050135 A | 3/2007 |
| JP | 2020518323 A | 6/2020 |

OTHER PUBLICATIONS

Hansilk, Disposable Toilet Bags for Travel Outdoor Camping RV Emergency Bedside Commode Liners with Absorbent Pads Portable Commode Bags(Universal—14 Pack), https://www.amazon.in/Disposable-Emergency-Absorbent-Portable-Universal/dp/B07GW5FQ4K.

Kunida Designs, Commode Liners—50 Disposable Toilet Bags for Bedside Commode Bucket, Portable Toilet Chairs, Bedpans—45×40 cm—0.06 Mils—Universal Fit, https://www.amazon.ca/Disposable-Commode-Liners-with-Drawstrings/dp/B08QD2RCTB.

* cited by examiner

RECREATIONAL VEHICLE WASTE RECEPTACLE

RELATED APPLICATION

The instant application is a 371 of International Application No. PCT/US2024/044398, currently pending, which is a continuation of U.S. Provisional Application No. 63/611,176, filed Dec. 17, 2023.

FIELD OF INVENTION

This invention relates to the field of recreational vehicle (RV) sanitation and more specifically to a disposable receptacle for RV toilets for use in cold weather.

BACKGROUND OF THE INVENTION

Use of Recreational Vehicles (RVs) has become increasingly popular. However, RV use is presently restricted in cold weather as the plumbing associated with RV toilets is subject to freezing and damage. The present invention allows RV toilets to be used without putting water into the RV plumbing system so that freezing issues can be avoided. The invention provides a single-use, disposable container for human waste products that is sized and shaped to be used with RV toilets. With these features, the present invention will allow year-long use of RVs.

Spanish Patent Application No. 1287244U describes a disposable bag for waste accumulation, comprising a guillotine for closing the bag when extracting it from the waste disposal cassette, and a bucket for transporting the bag. Closing the bag minimizes the diffusion of odours through the cassette enclosure, which could reach the outside or inside of the caravan.

U.S. Pat. No. 7,313,833B2 describes a vehicle emergency toilet system having portions built into the seat of the vehicle. The plastic toilet bowl includes a tubular extension having a closed bottom end, the tubular extension secured to bottom of the bowl. The removable closable portion of the reservoir means comprises a two-layer disposable replaceable plastic waste receiving bag. The waste receiving bag has an upper edge circumferentially equipped with a draw string for closing the top portion of the inner layer so as to seal the inner layer and provide a closable waste receiving reservoir to contain the waste for eventual disposal.

U.S. Pat. No. 2,801,426A describes light weight or portable toilets and, more particularly, to a form of toilet which uses an impervious bag supported beneath a more or less conventional toilet seat so that the bag is in an open condition ready for use. After use, by unlocking a hold-down latch on the toilet seat, and releasing the same, the seat is carried upwardly by a spring and in so doing, pulls the draw strings closing the bag. With the bag closed, all odors are confined and the same may be disposed of by any convenient means.

Japanese Patent No. 8905283B2 discloses a portable toilet device for automobiles. The toilet bag to be used with the device is formed of a water absorbing material. Waste can be easily and hygienically post-treated by closing the upper opening of the waste disposal bag and taking it out of the device. The waste disposal bag may be configured to close the upper opening with, for example, a removable tape, a button, or an adhesive attached to the edge of the upper opening together with a release paper.

U.S. Patent Application No. 2011/0247132 describes a collapsible fixed toilet that is mounted to a movable wall or sliding or telescoping rooms of Recreational Vehicles without connecting running water to the toilet. The toilet never needs cleaning due to the biodegradable plastic waste bag the covers the seat for each use. The collapsible fixed toilet can be operated in freezing temperatures. The toilet is equipped with a removable web support basket that supports the biodegradable plastic waste bag.

U.S. Pat. No. 6,116,780 discloses a disposable toilet receptacle that includes a bag and a funnel made of a sheet-like liquid-impermeable material, such as plastic film. The plastic film of which the bag is made may be a vapor barrier film. The top edge of the bag has a closure. The tapering body of the funnel is connected to the interior of the bag along a line extending between the side edges of the bag that defines a boundary between an upper chamber and a lower chamber. The portion of the funnel having the wide opening or inlet is disposed in the upper chamber, and the portion of the funnel having the narrower opening or outlet is disposed in the lower chamber. The lower chamber may have in it a gellable hydrophilic material that absorbs liquid waste.

Japanese Patent Application No. 2007050135A describes an excrement disposal bag provided with a plurality of holes or their patterns for passing a string therethrough at a prescribed interval near the bag body opening along the circumferential edge of the opening part.

U.S. Pat. No. 8,209,793B2 discloses a disposable portable toilet that is efficiently fabricated from foldable stock, such as corrugated cardboard, with minimal waste and adapted with a fluid absorbing inner liner is disclosed. Foldable stock material is formed as a blank sheet having a plurality of fold lines defining multiple panels disposed in side-by-side relation, and a joining tab. Each panel includes a fold-in tab that functions to provide a rim. The blank sheet provides a structure that may be configured to form a support structure that is selectively configurable from a collapsed configuration to an expanded configuration. An absorbent liner is inserted into the support structure. Padding sections are disposed on the liner in proximity to overlay the top rim of the support structure when the liner is received therein thereby providing the device with a padded upper rim. A drawstring functions as a closure member to close the liner after use.

Japanese Patent No. 2020518323A discloses an invention related to a device for conveniently collecting extracorporeal waste from a patient. One embodiment of the invention is a disposable plastic bag that can be attached to a toilet bowl, to collect external waste such as urine, feces, and vomiting containing toxic substances from chemotherapy treatments. The patent describes a hem defining an opening of the bag. The hem has an elastic band disposed inside the hem configured to secure the bag to the toilet bowl during use.

U.S. Pat. No. 7,260,855 describes a portable, individual, collapsible latrine especially suitable for outdoor use including military personnel. The latrine comprises a pair of generally rectangular shaped members, preferably of a molded plastic material, fitting one inside the other and hingedly connected, to form a collapsible frame. A pair of straps connect the upper ends of the two frame members to limit the extent of opening, and to support weight placed on the lid (namely the weight of a user). A lid (also of a molded plastic material) is hingedly connected to one of the frame members, preferably by means of a "living hinge" molded into the material. A disposable bag fits into an opening in the lid, for capturing human waste, with material in the bag to at least partially absorb the waste.

It is an objective of the present invention to provide a means for sanitary use of RV toilets without the need for flowing water. It is a further objective to provide a device that is light-weight, compact and easily stored and carried in an RV. It is a still further objective to provide a device that is easy to use without risk of contamination from human waste. It is a still further objective of the invention to provide a device that is self-sealing for storage prior to disposal. Finally, it is an objective of the present invention to provide an RV Waste Receptacle that is inexpensive and easy to manufacture.

While some of the objectives of the present invention are disclosed in the prior art, none of the inventions found include all the requirements identified.

SUMMARY OF THE INVENTION

The present invention addresses all of the deficiencies of other RV Waste Receptacle inventions and satisfies all of the objectives described above.

1) An RV waste receptacle can be constructed from the following components. A top layer is provided. The top layer is formed of flexible, absorbent material. A middle layer is provided. The middle layer is formed of flexible, impermeable material having the same planar dimensions as the top layer and affixed to the top layer at front, side and rear edges of the top layer. A bag is provided. The bag is formed of impermeable material and has an open mouth, sealed side seams and a sealed bottom seam. The bottom seam is joined to a rear edge of the middle layer. A bottom layer is provided The bottom layer is formed of flexible material and is joined to the middle layer at side and front edges of the middle layer and forming an open pocket for the bag at the rear edge of the bottom layer.

2) In a variant of the invention, the bag further includes a pull tab. The pull tab is attached to the open mouth of the bag. In use, the disposable RV waste receptacle is placed in an RV toilet and used. After use, the pull tab is pulled and the bag extends from beneath the middle layer. A user inserts a hand into the bag, grasps a folded underside of the bottom layer and pulls it and the contents of the top and middle layers into the bag. In the process, the bag turns inside out and the contents of the top, middle and bottom layers are then inside of the bag. The bag is then sealed and disposed of.

3) In a further variant, a closure mechanism is provided.

4) In still a further variant, the closure mechanism is selected from the group consisting of twist ties, drawstrings and sliding closures.

5) In yet a further variant, the top layer includes a portion formed of material having greater absorbency than regions of the top layer disposed outside of the portion, the portion being disposed adjacent the rear edge of the top layer and extending centrally toward the front edge of the top layer.

6) In another variant, the portion formed of material having greater absorbency than the regions of the top layer disposed outside of the portion includes material selected from the group comprising: absorbent polymer powder, starch, kaolin and fuller's earth.

7) In still another variant of the invention, a cover sheet positioned over the top layer is provided. The cover sheet keeps the top layer clean when in storage and can be used as emergency toilet paper.

8) In a final variant of the invention, the top layer, the middle layer, the bottom layer and the bag are formed of compostable materials

DETAILED DESCRIPTION OF THE PREFERRED EMBODIMENT

Figures 1, 2:
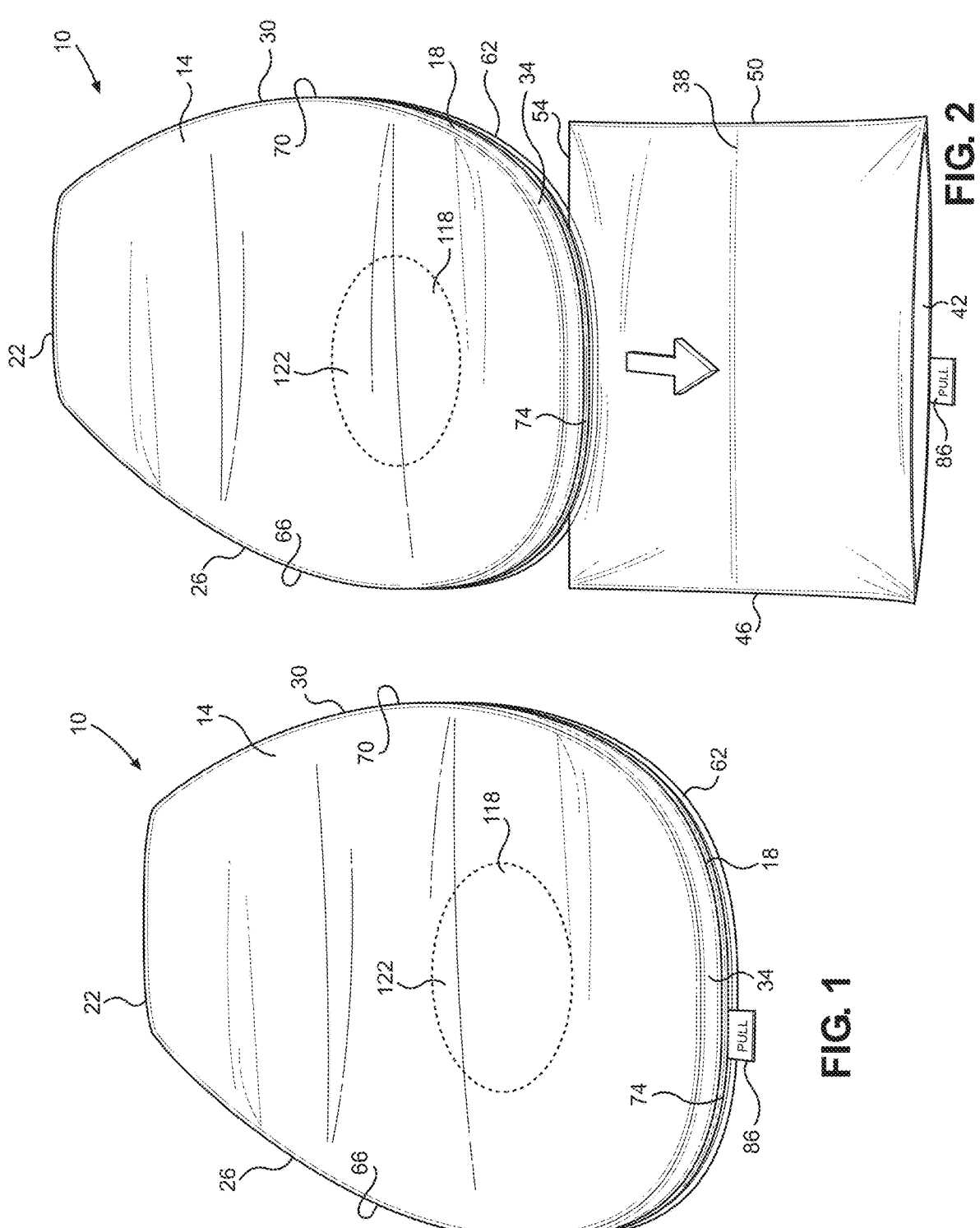
FIG. 1 is a perspective view of the preferred embodiment of the invention illustrating the top layer, the portion of the top layer formed of material having greater absorbency than regions of the top layer disposed outside of the portion and pull tab.
FIG. 2 is a perspective view of the of the FIG. 1 embodiment illustrating the bag in the extended position.

1) As illustrated in FIGS. 1-5, an RV waste receptacle 10 can be constructed from the following components. As shown in FIGS. 1, 2, 4A, 4B and 5, a top layer 14 is provided. The top layer 14 is formed of flexible, absorbent material. A middle layer 18 is provided. The middle layer 18 is formed of flexible, impermeable material having the same planar dimensions as the top layer 14 and affixed to the top layer 14 at front 22, side 26, 30 and rear 34 edges of the top layer 14. A bag 38 is provided. The bag 38 is formed of impermeable material and has an open mouth 42, sealed side seams 46, 50 and a sealed bottom seam 54. The bottom seam 54 is joined to a rear edge 58 of the middle layer 18. A bottom layer 62 is provided The bottom layer 62 is formed of flexible material and is joined to the middle layer 18 at side 66, 70 and front 74 edges of the middle layer 18 and forming an open pocket 78 for the bag 38 at a rear edge 82 of the bottom layer 62.

Figure 3:
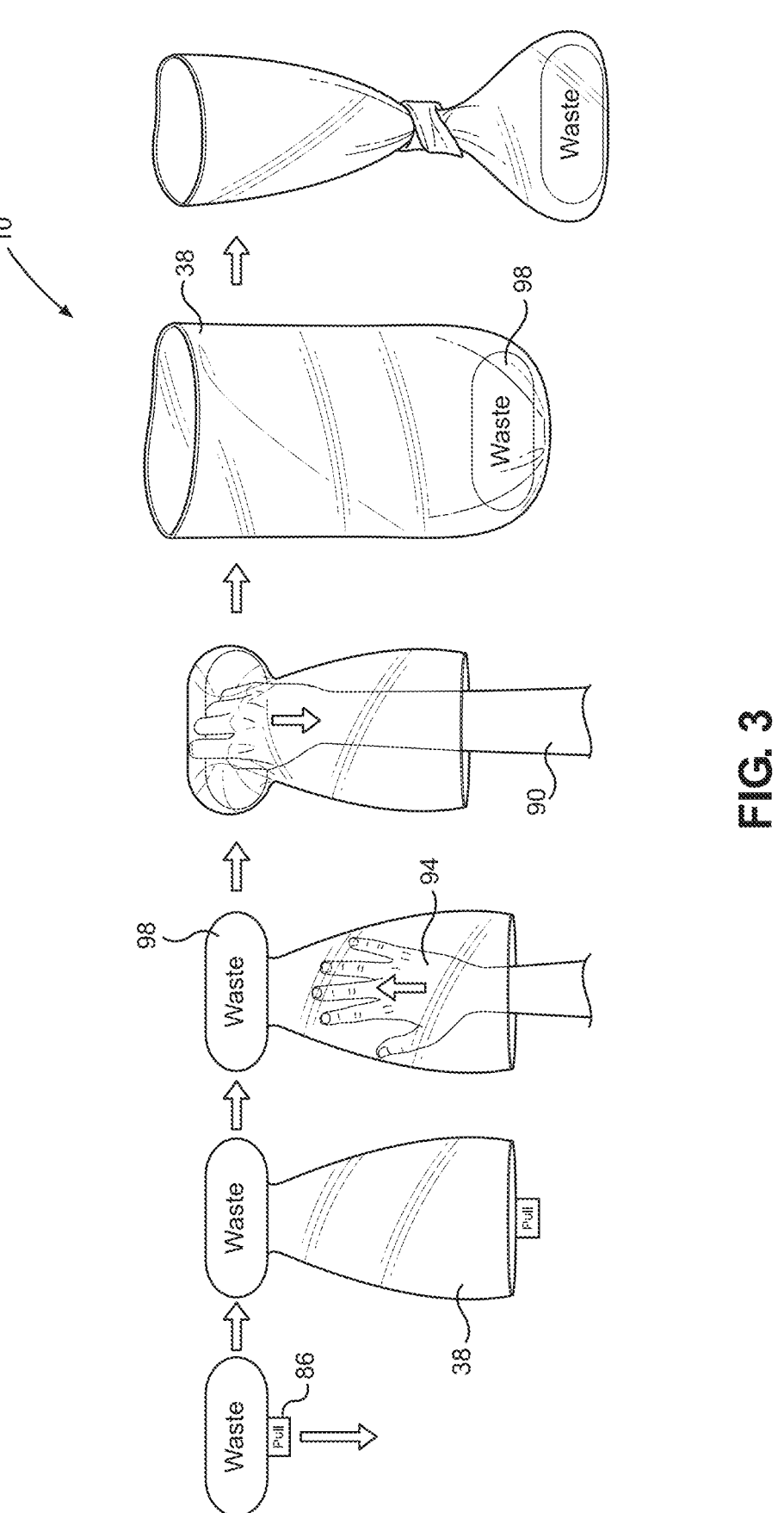
FIG. 3 is a perspective view of the of the FIG. 1 embodiment in six progressive views of the use of the invention.

2) In a variant of the invention, the bag 38 further includes a pull tab 86. The pull tab 86 is attached to the open mouth 42 of the bag 38. In use, as illustrated in FIG. 3, the disposable RV waste receptacle 10 is placed in an RV toilet (not shown) and used. After use, the pull tab 86 is pulled and the bag 38 extends from beneath the middle layer 18. A user 90 inserts a hand 94 into the bag 38, grasps a folded underside 98 of the bottom layer 62 and pulls it and the contents of the top 14 and middle 18 layers into the bag 38. In the process, the bag 38 turns inside out and the contents of the top 14, middle 18 and bottom layers 62 are then inside of the bag 38. The bag 38 is then sealed and the RV waste receptacle 10 is disposed of.

Figures 3A, 3B, 3C:
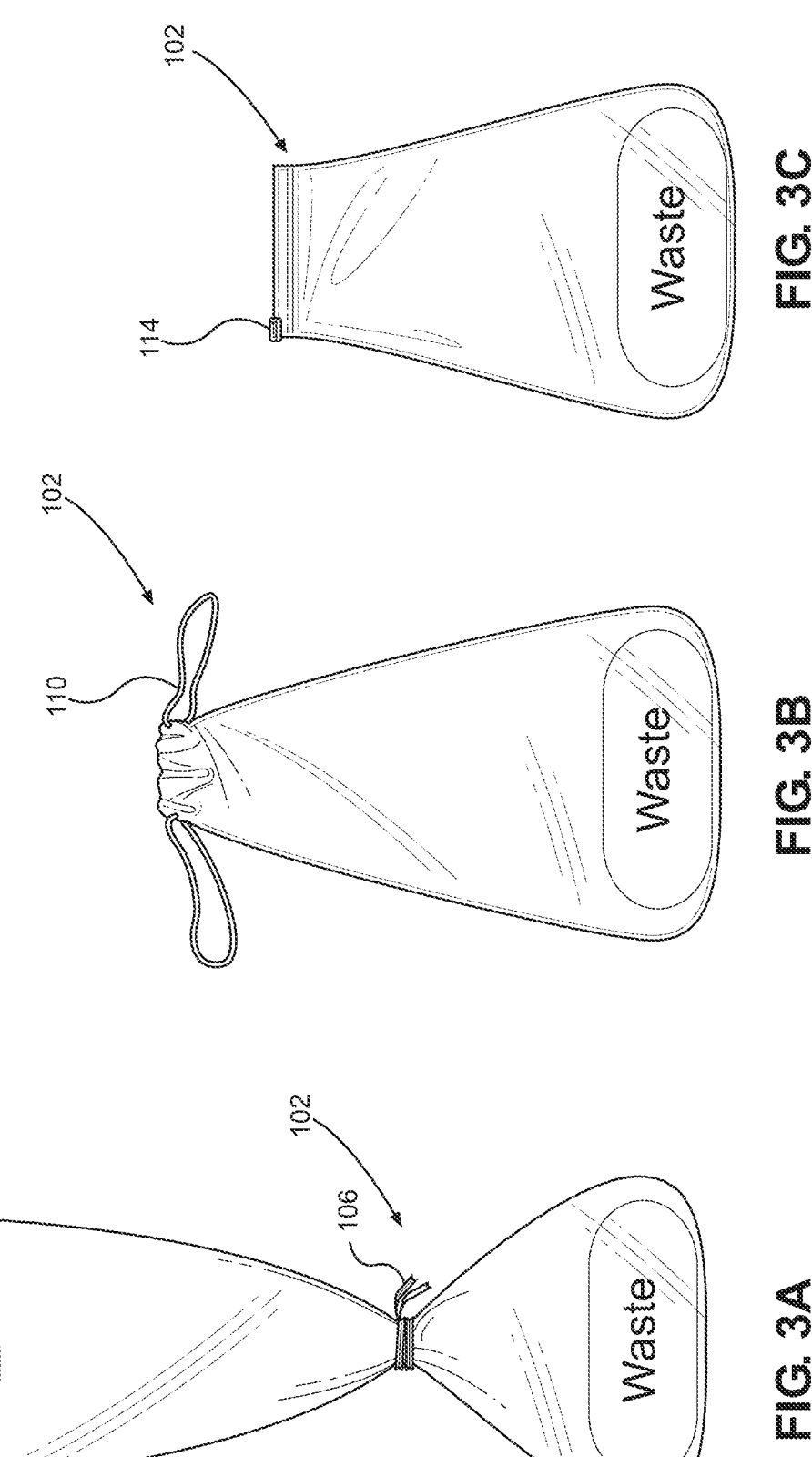
FIG. 3A is a perspective view of the of the FIG. 1 embodiment illustrating a twist tie closure for the bag.
FIG. 3B is a perspective view of the of the FIG. 1 embodiment illustrating a drawstring closure for the bag.
FIG. 3C is a perspective view of the of the FIG. 1 embodiment illustrating a sliding closure for the bag.

3) In a further variant, as illustrated in FIGS. 3A, 3B and 3C, a closure mechanism 102 is provided.

4) In still a further variant, the closure mechanism 102 is selected from the group consisting of twist ties 106, drawstrings 110 and sliding closures 114.

5) In yet a further variant, as illustrated in FIGS. 1 and 2, the top layer 14 includes a portion 118 formed of material having greater absorbency than regions of the top layer disposed outside of the portion 122, the portion 122 being disposed adjacent the rear edge 34 of the top layer 14 and extending centrally toward the front edge 22 of the top layer 14.

6) In another variant, the portion 118 formed of material having greater absorbency than the regions of the top layer disposed outside of the portion 122 includes material selected from the group comprising: absorbent polymer powder, starch, kaolin and fuller's earth.

Figures 4A, 4B, 5:
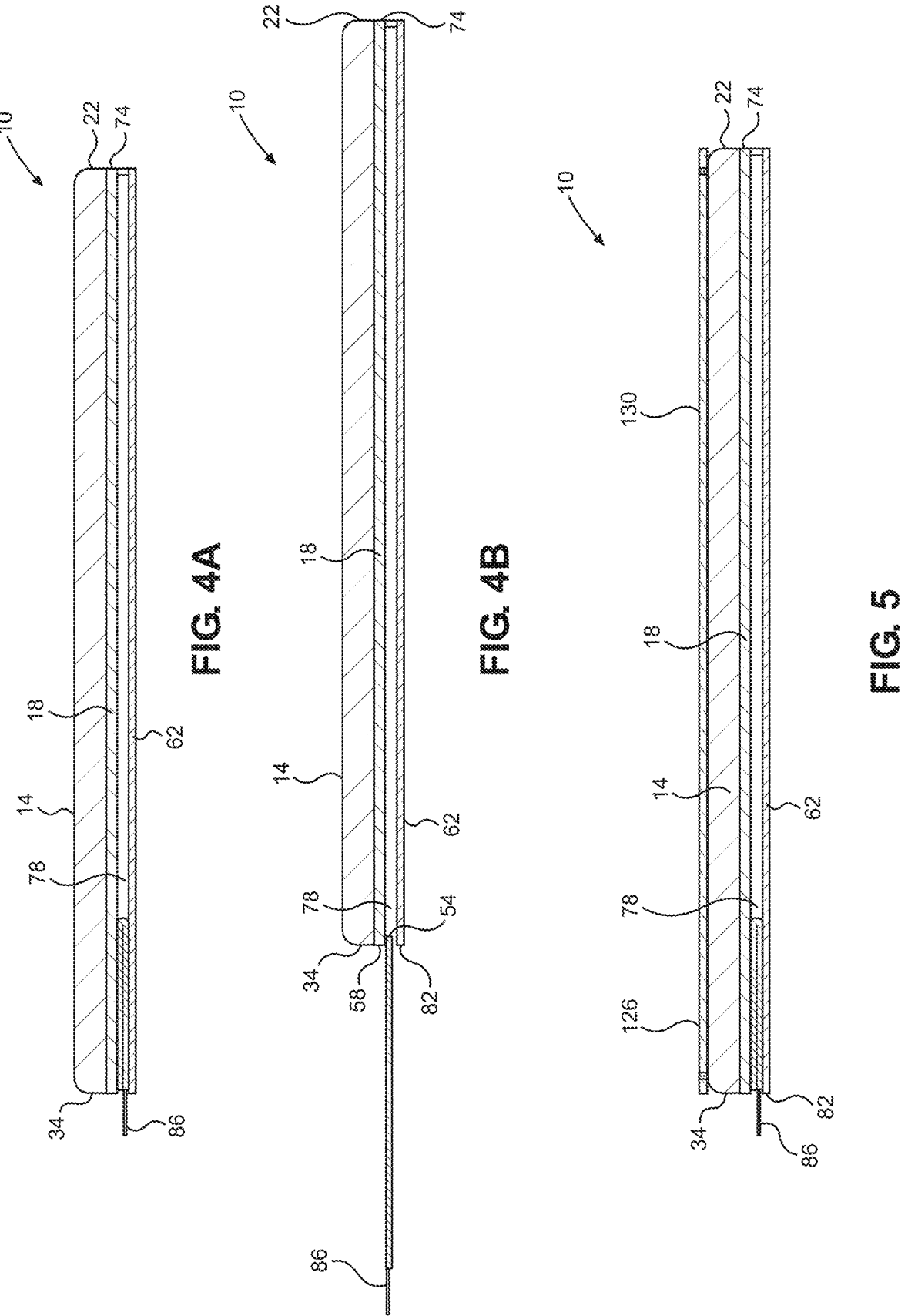
FIG. 4A is a side cross-sectional view of the FIG. 1 embodiment illustrating the top, middle and bottom layers of the invention and the bag folded between the middle and bottom layers.
FIG. 4B is a side cross-sectional view of the FIG. 2 embodiment illustrating the top, middle and bottom layers of the invention and the bag extended from between the middle and bottom layers.
FIG. 5 is a side cross-sectional view of the FIG. 1 embodiment illustrating the top, middle and bottom layers of the invention and the bag folded between the middle and bottom layers and a cover sheet over the top layer.

7) In another variant of the invention, as illustrated in FIG. 5, a cover sheet 126 positioned over the top layer 14 is provided. The cover sheet 126 keeps the top layer 14 clean when in storage and can be used as emergency toilet paper 130.

8) In a final variant of the invention, the top layer 14, the middle layer 18, the bottom layer 62 and the bag 38 are formed of compostable materials

The invention claimed is:

1. An RV waste receptacle, comprising:
a unitary top layer, said unitary top layer being formed of flexible, absorbent material and having first planar dimensions;
a middle layer, said middle layer being formed of flexible, impermeable material and having said first planar dimensions and being affixed to said unitary top layer at front, side and rear edges of said unitary top layer;
a bag, said bag being formed of impermeable material and having an open mouth, sealed side seams and a sealed bottom seam;

said bottom seam being joined to a rear edge of said middle layer;
a bottom layer, said bottom layer being formed of flexible material and being joined to said middle layer at side and front edges of said middle layer and forming an open pocket between said bottom layer and said middle layer for said bag at a rear edge of said bottom layer;
said unitary top layer including a portion formed of material having greater absorbency than regions of said unitary top layer disposed outside of said portion, said portion being disposed adjacent said rear edge of said unitary top layer and extending centrally toward said front edge of said unitary top layer; and
said bottom layer having said first planar dimensions and being co-extensive with said middle layer.

2. The RV waste receptacle, as described in claim 1, further comprising a pull tab, said pull tab being attached to said open mouth of said bag.

3. The RV waste receptacle, as described in claim 1, further comprising a closure mechanism.

4. The RV waste receptacle, as described in claim 3, wherein said closure mechanism is selected from the group comprising twist ties, drawstrings and sliding closures.

5. The RV waste receptacle, as described in claim 1, wherein said portion formed of material having greater absorbency than said regions of said top layer disposed outside of said portion includes material selected from the group comprising: absorbent polymer powder, starch, kaolin and fuller's earth.

6. The RV waste receptacle, as described in claim 1, further comprising a cover sheet, said cover sheet being disposed over said top layer.

7. The RV waste receptacle, as described in claim 1, wherein said top layer, said middle layer, said bottom layer and said bag are formed of compostable materials.

* * * * *